A. OVERBAGH.
Egg Fryer.
No. 44,886.
Patented Nov. 1, 1864.
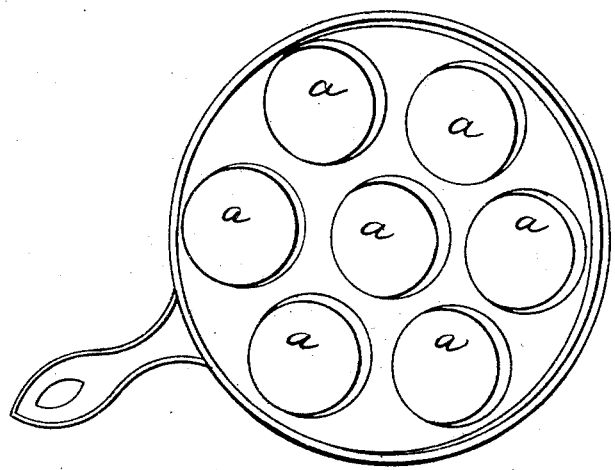
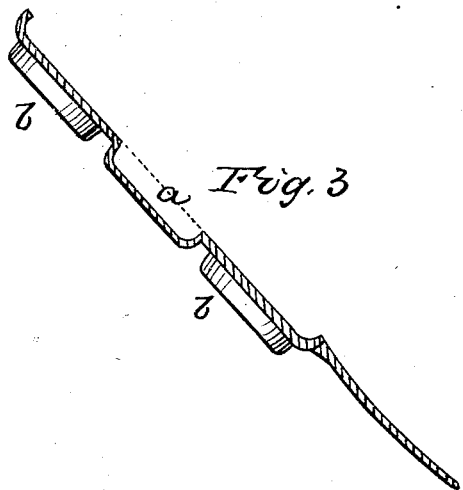
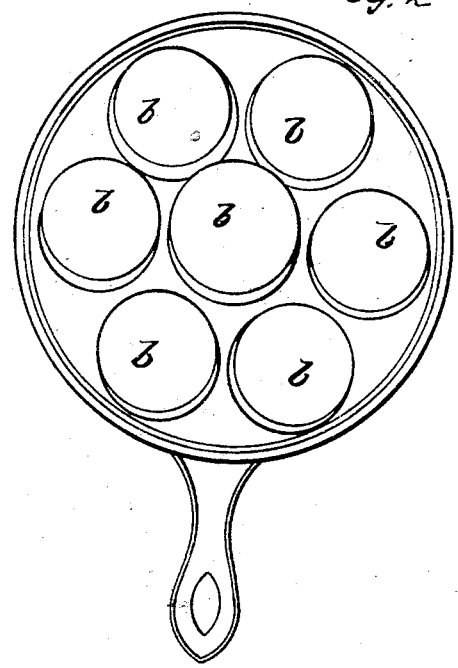
Witnesses
Thos. H Cantly
Geo. S Rowley
Inventor
Alewson Overbagh

UNITED STATES PATENT OFFICE.

ADDISON OVERBAGH, OF HUDSON, NEW YORK.

IMPROVED EGG-FRIER.

Specification forming part of Letters Patent No. 44,886, dated November 1, 1864.

*To all whom it may concern:*

Be it known that I, ADDISON OVERBAGH, of the city of Hudson, in the county of Columbia and State of New York, have invented a new and useful article in the nature of a spider or pan for frying eggs, which I denominate "Overbagh's Egg-Frier;" and I do hereby declare that the following is a full, clear, and exact description thereof, reference being had to the annexed drawings, making a part of this specification, in which—

Figure 1 is a view of the top or upper side; Fig. 2, a view of the bottom of under side, and Fig. 3 a transverse section thereof.

The nature of my invention consists of a shallow cast-iron pan or spider with several distinct shallow depressions with flat bottoms, each sufficient to contain an egg of ordinary size and confine it within a limited space, so that it may cook uniformly, and when done be in a circular or some other agreeable and symmetrical form.

To enable those skilled in the art to make and use my invention, I will proceed to describe its construction and operation.

I construct my egg-frier of cast-iron, and usually of a circular form similar to a griddle used for baking buckwheat cakes; but, instead of having a plain and uniform surface for a bottom, it has several distinct (in the size I usually make seven) cup like depressions *a a a*, &c., (see Fig. 1,) about half an inch in depth by three inches in diameter, of a circular or other desirable form, with nearly perpendicular sides, and flat bottoms, *b b b*, &c. (See Fig. 2.)

The object of making the bottoms flat is that they may all come in contact with the heat and cook with entire uniformity. By confining the egg within the dimensions of the cups *a a a*, &c., no part of it becomes harder than another, as it does when the albumen or white is cooked on a flat surface.

The lard or butter used in cooking the egg is confined wholly to the cup in which it is deposited. These cups *a a a*, &c., may be of any form desired, and of such capacity as to make the egg, when cooked, of any required thickness.

The advantages I claim for this egg-frier are economy of fuel and of grease used in cooking. Eggs may be easily cooked on the top of the stove with an ordinary fire without removing the covers, and no grease is required except what is actually needed for the cooking of the egg, whereas in the ordinary mode of frying them much is consumed between the eggs which is not required. The egg, being of uniform thickness, has, therefore, when done no hard edges or parts which can neither be masticated nor digested. Its beautiful and symmetrical appearance when placed on the plate or served is also no small advantage, or, at least, not an objectionable one.

This article is also very convenient for other culinary uses, such as cooking omelets, biscuits, muffins, and many kinds of cakes. It may be made of tin, sheet-iron, or other metal, as well as of cast-iron.

What I claim as my invention, and desire to secure by Letters Patent of the United States, is—

Combining and arranging several distinct cup like depressions *a a a*, &c., of uniform depth in one pan or spider having perpendicular sides, or nearly perpendicular sides, and flat bottoms, in the manner and for the purpose set forth.

ADDISON OVERBAGH.

Witnesses:
GEO. S. ROWLEY,
THOS. H. GANTLEY.